United States Patent [19]
Mogul

[11] Patent Number: 5,675,763
[45] Date of Patent: Oct. 7, 1997

[54] CACHE MEMORY SYSTEM AND METHOD FOR SELECTIVELY REMOVING STALE ALIASED ENTRIES

[75] Inventor: Jeffrey Clifford Mogul, Menlo Park, Calif.

[73] Assignee: Digital Equipment Corporation, Maynard, Mass.

[21] Appl. No.: 514,350

[22] Filed: Aug. 4, 1995

Related U.S. Application Data

[63] Continuation of Ser. No. 915,122, Jul. 15, 1992, abandoned.

[51] Int. Cl.$^6$ .............................. G06F 12/12; G06F 13/00
[52] U.S. Cl. .......................... 395/462; 395/417; 395/403
[58] Field of Search .................................. 395/445, 446, 395/449, 460, 462, 471, 483, 486, 403, 405, 415, 416, 417

[56] References Cited

U.S. PATENT DOCUMENTS

| | | | |
|---|---|---|---|
| 4,525,778 | 6/1985 | Cane | 395/417 |
| 4,713,755 | 12/1987 | Worley, Jr. et al. | 395/450 |
| 4,774,659 | 9/1988 | Smith et al. | 395/418 |
| 5,003,459 | 3/1991 | Ramanujan et al. | 395/403 |
| 5,119,290 | 6/1992 | Loo et al. | 395/420 |
| 5,146,603 | 9/1992 | Frost et al. | 395/470 |
| 5,214,770 | 5/1993 | Ramanujan et al. | 395/450 |
| 5,278,964 | 1/1994 | Mathews et al. | 395/403 |

Primary Examiner—Glenn Gossage
Attorney, Agent, or Firm—Lindsay G. McGuinness; Ronald C. Hudgens; Arthur W. Fisher

[57] ABSTRACT

A cache memory system and method for selectively removing stale "aliased" entries, which arise when portions of several address spaces are mapped into a single region of real memory, from a virtually addressed cache, are described. The cache memory system includes a central processor unit (CPU) and a first-level cache on an integrated circuit chip. The CPU receives tag and data information from the first level cache via virtual address lines and data lines respectively. An off-chip second level cache is additionally coupled to provide data to the data lines. The CPU is coupled to a translation lookaside buffer (TLB) via the virtual address lines, while the second level cache is coupled to the TLB via physical address lines. The first and second level caches each comprise a plurality of entries. Each of the entries includes a status bit, indicating possible membership in a class of entries that might require flushing. Address translation database entries (page table entries or translation lookaside buffer (TLB) entries) are augmented with a field that contains the appropriate value of the status bits of each first and second level cache entry. Status bits are set for any page in which stale aliases may potentially occur (i.e., those shared pages that can be modified by at least one process or device). The cache-fill mechanism includes a path combining the status bits with the data being loaded into the first-level cache.

12 Claims, 4 Drawing Sheets

CACHE MEMORY SYSTEM AND METHOD FOR SELECTIVELY REMOVING STALE ALIASED ENTRIES

This application is a continuation of application Ser. No. 07/915,122, filed Jul. 15, 1992, now abandoned.

BACKGROUND OF THE INVENTION

1. Field of the Invention

The present invention relates generally to a cache memory system and method which allows the selective removal of a class of entries from a virtually-addressed cache. More particularly, it relates to such a cache memory system and method in which the selective removal is used to remove stale "aliased" entries, which arise when portions of several address spaces are mapped onto a single region of real memory.

2. Description of the Prior Art

Virtually all modern operating systems use memory management mechanisms to map from virtual address spaces (usually, one per process) to the physical (or "real") address space of the computer system hardware. It is possible, and useful, to map portions of several virtual address spaces onto a single region of real addresses. This is done to permit rapid communication between processes; rather than copying data via the operating system kernel, a pair of processes may communicate by sharing access to a page of memory into which one (or both) of them writes new information. Similarly, an input/output (I/O) interface may be told to write incoming data directly into the memory owned by a particular process, to avoid the requirement of copying the data through the kernel.

Modern computer systems depend on caches for their high performance. It is common to use virtual addresses for the tags in the primary (highest level) cache. This is because that cache might be able to deliver data to the Central Processing Unit (CPU) in a single cycle only if the virtual-to-physical address translation is not in the path between the CPU and that cache.

Since many processes will use the same virtual address to refer to different elements of real memory, tags for virtually-addressed caches often include a process-identifier (PID) field. This allows the system to switch between processes without having to invalidate the entire cache.

Virtually addressed caches can cause problems when real address space is shared between several processes. This is because, when one process updates a word in the shared address space, another process may not see the new data because it may have an apparently-valid cache entry containing the old data. The term "alias" is used to refer to an address of a data item that may be addressed in two or more ways.

There are two ways to solve this problem. One is to add hardware support to the cache so that it recognizes aliases. For example, one might have the cache hardware remember the physical address associated with each entry, and then invalidate the entry if a write is done to a different entry with the same associate physical address. Such hardware might be expensive or infeasible, or might simply not be the best application of scarce hardware resources.

The other solution to the problem is to arrange to "flush" (invalidate) the stale cache entries when switching between processes. This introduces a new problem: how does one flush the stale entries without having to flush the whole cache (and thus wasting the effort required to reload the non-stale entries)?

Note that in the specific case of a system that has a direct-mapped cache that is no larger than the virtual memory page size, and in which all modifications of shared data are done by stores from the CPU, stale aliases cannot occur. This is because a multiply-mapped memory item exists at the same page offset in all address spaces, and so will always collide in the cache. In those memory systems with caches larger than their page size, or those with partly or fully associative caches, or that allow I/O devices (or other CPUs) to modify data in the real address space, stale aliases can occur.

Finally, a system that allows processes to directly read I/O device registers via memory-mapped I/O may allow stale aliases to occur in the cache, if the device changes its register value while a cached copy of the register exists.

SUMMARY OF THE INVENTION

The present invention is intended to provide an efficient solution to the above problem, as well as any other problems that might require selective flushing of cache entries. These and related problems may be solved through use of the novel cache memory system and method with selective entry removal herein disclosed. A cache memory system in accordance with this invention has a processor and a cache having a tag field connected to the processor by at least one virtual address line and a data field. The cache is apportioned into a plurality of entries, with each entry of the cache having a status field containing at least one bit for indicating possible membership of an entry in a class of entries that may require selective flushing from the cache. A means is connected to the processor for setting the at least one bit in the status field of the entry of the cache, where the bit is set to indicate membership of the entry in a class of entries that may require selective flushing from the cache. The cache memory system also includes means, connected to said cache, for selectively flushing the entry in the cache having the at least one bit in the status field set, where the at least one bit is set to indicate membership of the entry in a class of entries that may require selective flushing from the cache.

A method of operating a cache memory system with a processor and a cache having a tag field connected to the processor by at least one virtual address line and a data field in accordance with this invention includes providing a status field for each entry in the cache containing at least one bit for indicating possible membership of an entry in a class of entries that may require selective flushing from the cache. The at least one bit is set to indicate membership of the entry in a class of entries that may require selective flushing from the cache. The entry having the at least one bit of the status field set to indicate membership of the entry in a class of entries that may require selective flushing from the cache is selectively flushed.

The attainment of the foregoing and related advantages and features of the invention should be more readily apparent to those skilled in the art, after review of the following more detailed description of the invention, taken together with the drawings, in which:

DETAILED DESCRIPTION OF THE INVENTION

Figure 1:
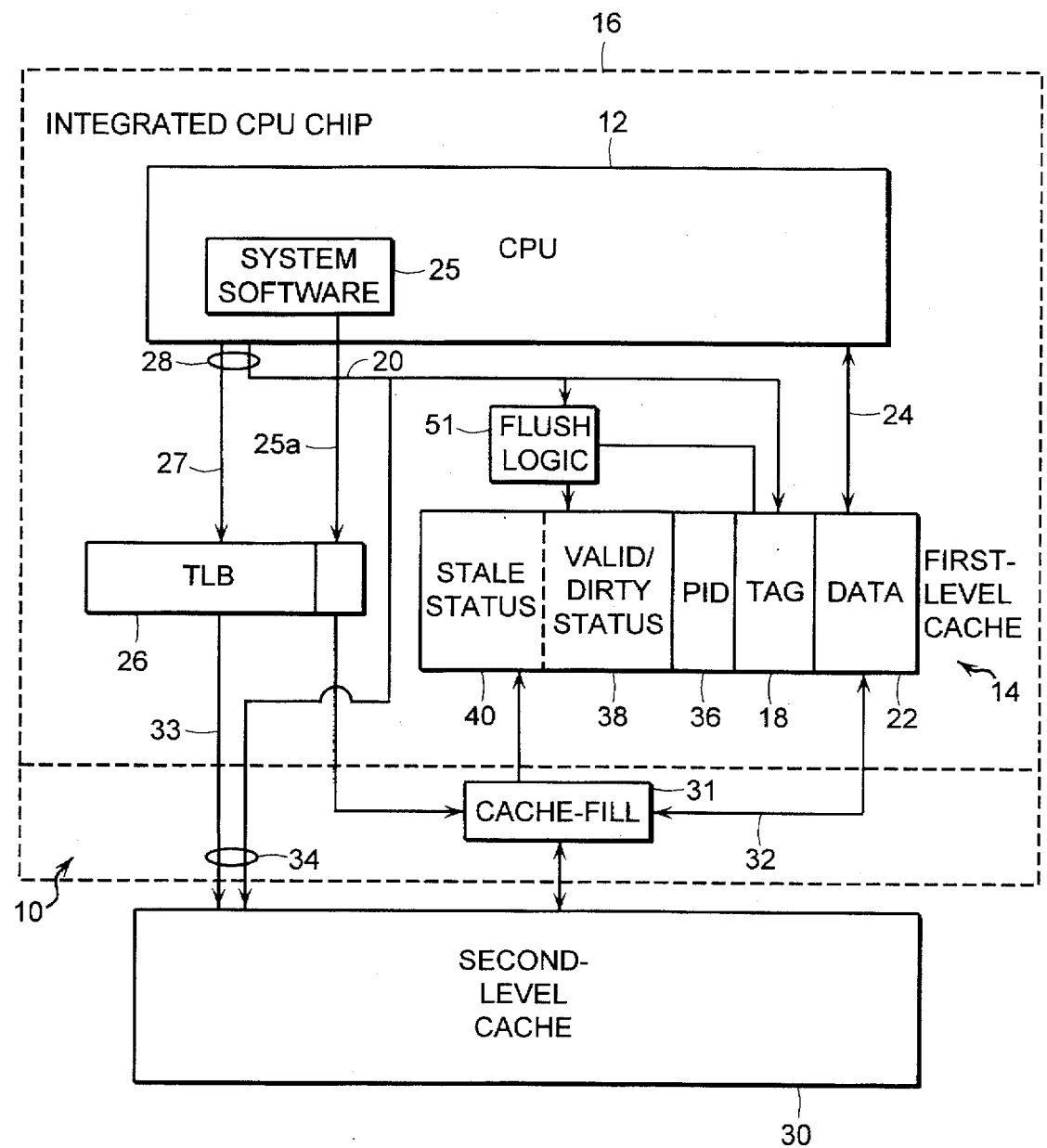
FIG. 1 is a block diagram of a memory system in accordance with the invention.

Turning now to the drawings, more particularly to FIG. 1, there is shown a memory system 10 having a CPU 12 and a first-level cache 14 on an integrated circuit chip 16. The CPU 12 is connected to tag field 18 of the first-level cache 14 by virtual address lines 20 and to data field 22 of the first-level cache by data lines 24. The CPU is also connected to a translation lookaside buffer (TLB) 26 by virtual address lines 27. The virtual address lines 20 and 27 comprise a set of 28 of virtual address lines. The data field 22 is connected to an off-chip second-level cache 30 by data lines 32 via Cache_Fill logic 31. The TLB 26 is connected to the second-level cache 30 by cache address lines 34, which comprise the virtual address lines 20 and physical address lines 33 connecting the TLB 26 and the cache 30.

Cache entries typically include fields associated with the cached data 22: the tag field 22 describing the address of the data 22, an optional PID field 36 or other address space identifier, and a few status bits 38 indicating things like "valid" and "dirty". A first part of the invention is to add an additional status bit 40 to each entry, indicating possible membership in a class of entries that might require selective flushing. The system of FIG. 1 has one such status bit 40, denoting those cache entries that may become stale aliases. However, the invention may be applied in situations where several distinct classes exist, each of which may be associated with a distinct status bit 40.

Once the cache entries are marked with such a status bit 40, it is easy to see how one might implement hardware to flush selectively only those entries with the bit set to one. For example, if the system has an operation that invalidates the entire cache, it might be augmented to include a second operation that invalidates only those entries with the status bit(s) 40 set. Or, if the system includes an operation to flush a particular cache line, it could be augmented with another operation that selectively flushes a line, depending on the value(s) of the status bit(s) 40. The augmented operations may be given distinct operation codes, or a control register may be employed to select between the two behaviors ("flush always" or "flush selectively").

In some systems with direct-mapped caches, there may not be an explicit operation for flushing a line of the cache (or the entire cache). Instead, the operating system might have to execute a load operation (or series of load operations) designed to "collide" with the line (or lines) in question. This invention may be used in such a system without introducing any new explicit operations. Instead, the logic that compares cache tags with the virtual addresses issued by the CPU could be designed to treat one special bit of the virtual address in an unusual manner:

- If the special bit in the virtual address is clear, then the rest of the address is compared with the tag in the usual way.
- If the special bit in the virtual address is set, then in order for a "match" to occur, not only must the rest of the virtual address match the tag field, but the status bit must also be set.

Figure 2:
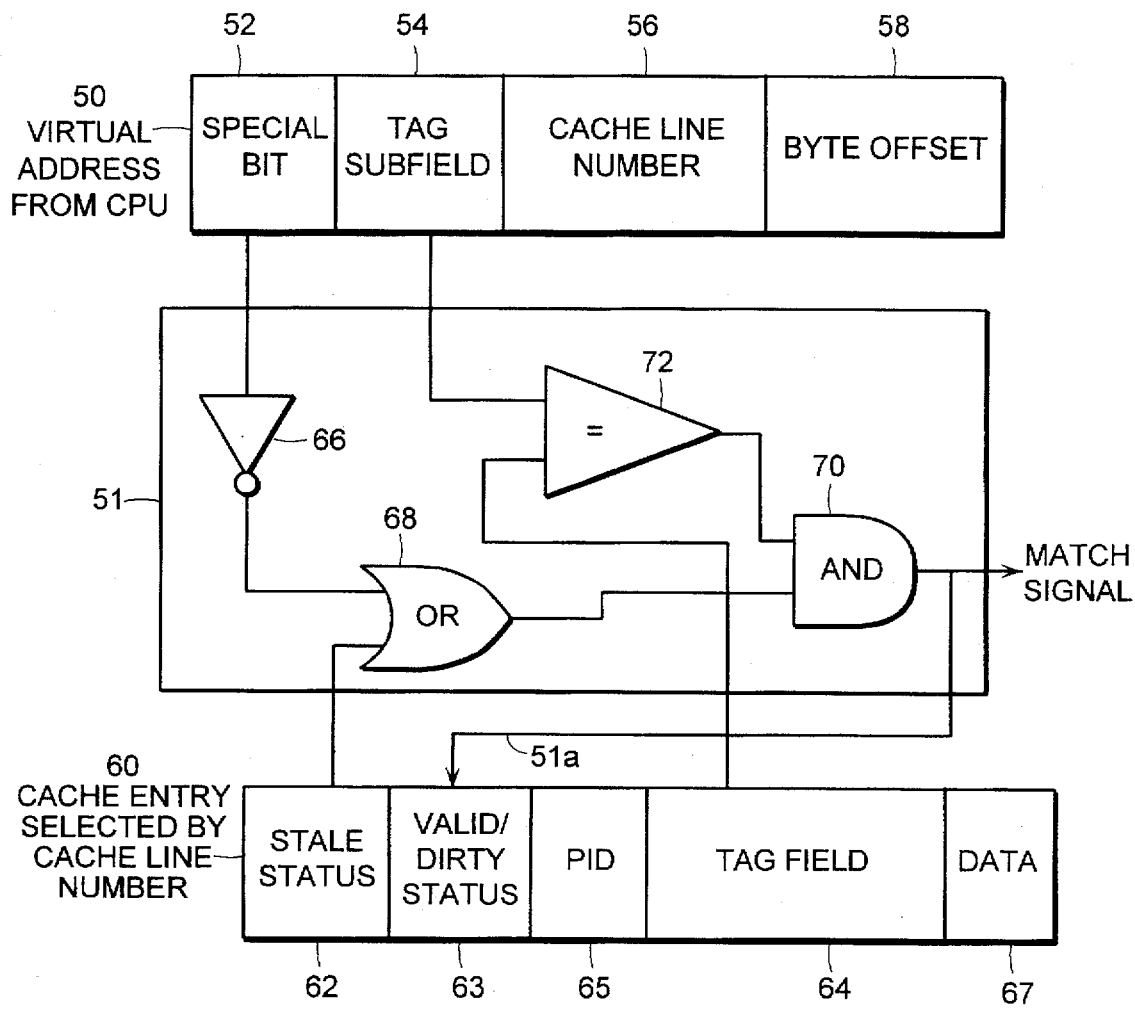
FIG. 2 is a block diagram of control logic that may be used in the memory system of FIG. 1 for selective flushing.

An example of a system for flushing entries in a first-level cache is shown in FIG. 1. A flush system 51 is shown coupled to virtual address lines 20 and to the first-level cache entry 14. Depending upon the values of the status bits and the values of the tags of each of the input entries, the flush system 51 selectively outputs a signal on line 51a to invalidate a corresponding first-level cache entry. FIG. 2 shows logic for such a flush system 51. The flush system 51 is capable of always flushing or selectively flushing a cache entry without introducing any new explicit operations. Here, the virtual address 50 from the CPU is analogous to the virtual address provided on line 20 of FIG. 1, and the cache entry 60 is analogous to an entry from the first-level cache 14 of FIG. 1. Each virtual address 50 from the CPU includes a special bit field 52, a tag subfield 54, a cache line number field 56 and a byte offset field 58. The cache line number field 56 is used to select a cache entry 60, which includes a status bit field 62 and a tag field 64. The special bit field 52 is supplied to an inverter 66, the output of which forms one input to OR gate 68. The other input to the OR gate 68 is the entry in the status bit field 62. The output of the OR gate 68 is one input to AND gate 70. The tag subfield 54 and the tag field 64 are supplied to comparator 72. The output of comparator 72 is the other input to AND gate 70. The output of AND gate 70 is a match signal, which, when present, means that the cache entry 60 should be flushed. Thus the match signal on line 51a is used to force the value of the VALID/DIRTY STATUS field 63 to invalid.

Therefore, to flush all of the entries of the current process, one executes a loop loading from one address per cache line of a region in the normal part of virtual address space. This operation may be executed with the following code in "C":

```
/* loop to flush all cache lines for current process */
int i;
char *ptr;
char mapped_area[CACHESIZE];
ptr = mapped area;
for (i = 0; i < CACHESIZE; i +=LINESIZE/WORDSIZE) {
    dummy = ptr[i];
}
```

To flush selectively, one executes a similar loop that loads from a region of virtual addresses that have the special bit set, for example, using the following code:

```
/* loop to flush only selected (e.g., stale) cache lines for current process */
int i;
char *ptr;
char mapped_area[CACHESIZE];
ptr = mapped area;
(* (int *)(ptr) | = SPECIAL BIT MASK; /* set special bit in address */
for (i = 0; i < CACHESIZE; i += LINESIZE/WORDSIZE) {
    dummy = ptr[i];
}
```

One may not have to reserve half of virtual addresses solely for this purpose; the system architecture might already have split the address space into suitable regions. For example, it may be the case that a shared page can never reside in the "kernel" region of a process address space.

Since, in most instances, few (if any) cache lines will actually be stale, the most efficient invalidation mechanism is one that requires a small, constant number of cycles no matter how many marked (potentially stale) entries exist in the cache. An operation that flushes the entire cache in one step fits this criterion. Intermediate in efficiency is the use of an instruction to invalidate selectively a single line, since this will cost one cycle per cache line. Least efficient is the use of an intentional-conflict scheme, since it may cost many cycles to refill the cache.

Note that the system software may be able to avoid flushing upon every access switch, since it should be able to distinguish those processes that do not have potential aliases (e.g., because they do not currently share pages with another process). In practice, this refinement may be only marginally beneficial, since many systems that allow memory sharing almost require processes to make use of it.

Even in such systems, one common interaction is to switch away from a process briefly, and then switch back to it. The system software may exploit this pattern. Suppose that in the process control block there is a sequence number field, set when the system switches away from the process. The value is set from a global counter that is incremented once per context switch. If, on switching to a process, the current global sequence number is exactly 2 higher than the previous sequence number for the new process, and the previous process is not sharing any pages with the new process, then no flushing is required. The following code may be used to handle this situation:

/* function to decide if flushing is necessary on a context switch */ static int global_sequence_number;

is flush needed (new_process, previous_process) struct process_state *new_process;

struct process_state *previous_process;

```
{
    previous_process->last_sequence_number = global_sequence_number;
    if (new_process->last_sequence_number = = global_sequence_number +2) {
        if (no_shared_pages (new_process, previous process))
            return (FALSE);
    }
    return (TRUE);
}
```

The question of which processes share pages may be answered through a single access to a bit map whose size is proportional to the square of the number of processes.

The next question is "how are the new status bits set in the cache 14?" The second part of the invention covers this.

In order for a possibly-stale entry to have gotten into the cache 14 in the first place, it must have been loaded from lower in the memory hierarchy, as the result of a miss. This is not true for caches with a line size of one word; this case is covered later on. At the time the cache 14 was loaded, the necessary virtual-to-physical address translation had already been done. Therefore, if the correct value of the status bit 40 is available as an output of the mapping procedure, it will be available when the cache line is loaded, and so can be entered into the cache without affecting the timing of cache access or refill.

The second part of the invention is that the address translation mechanism database entries (page table entries or translation lookaside buffer (TLB) 26 entries) are augmented with a field that contains the appropriate value of the new status bit(s) 40. System software in CPU 12 sets the bit(s) 40, via line 25a, for any page in which stale aliases may potentially occur (i.e., those shared pages that can be modified by at least one process or device). A cache-fill mechanism 31 includes a path combining the value of the status bit(s) 40 with the data being loaded into the cache 14.

If the cache 14 does have a line size of one word, then entries may appear in the cache 14 without being loaded from lower in the hierarchy. Thus, the status bit(s) 40 cannot always be set properly based simply on the cache-fill procedure. Instead, some additional mechanism may be needed, which is invoked at the time that modified data is actually written from the cache into the memory hierarchy. Whenever this write does occur, the address translation process must be invoked anyway, and so the value(s) of the status bit(s) will become available. However, by the time they are available it may be hard to insert them back into the cache 14 entries. Alternatively, a simple solution would be to set the "potentially-stale" bit 40 in the cache 14 line whenever a store occurs. This is less efficient than the preferred form of the invention, but still more efficient than a system without selective invalidation; the simplified version of the invention will always avoid flushing of lines that are read but not written.

Figure 3:
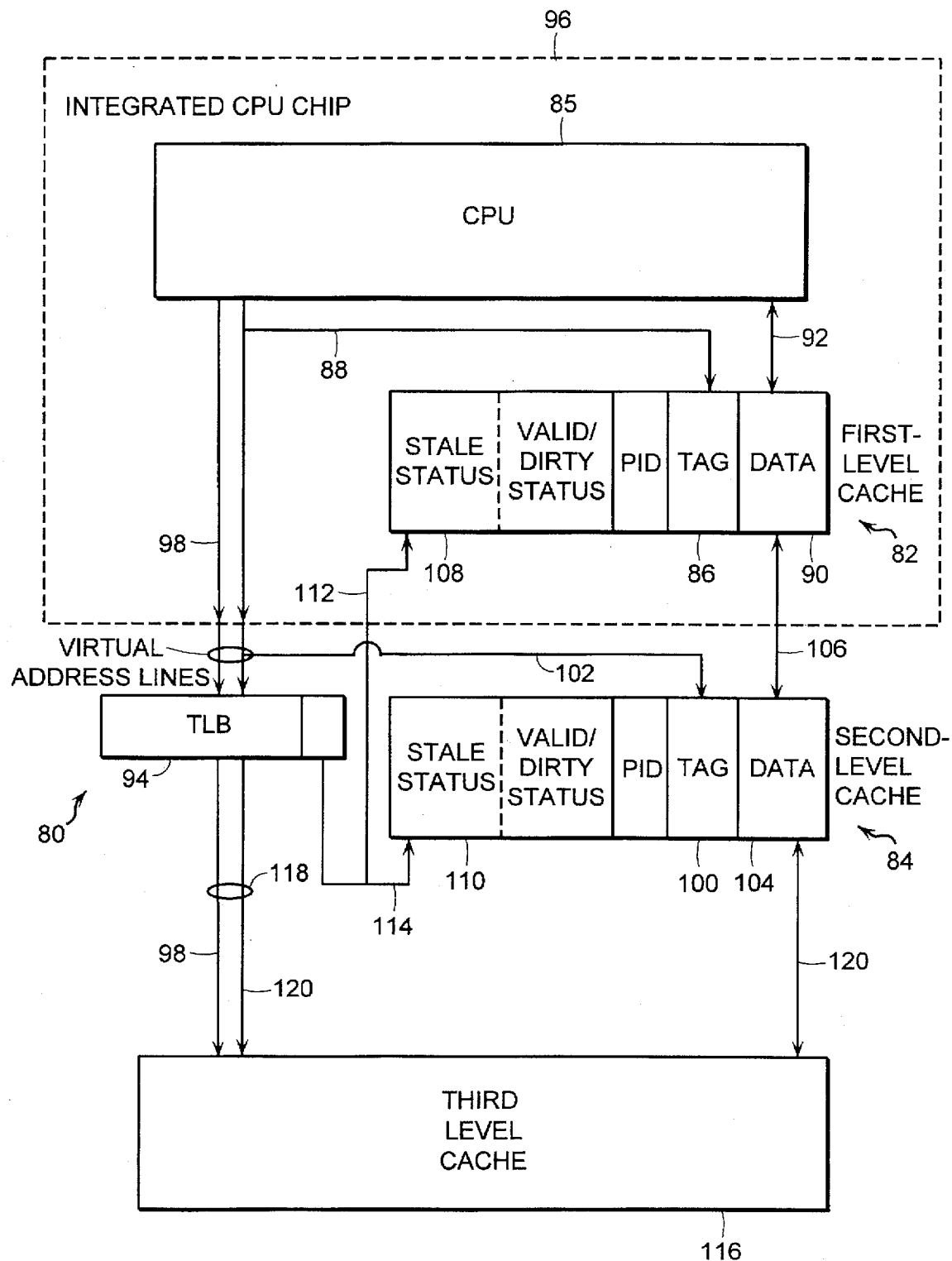
FIG. 3 is a block diagram of a second embodiment of a memory system in accordance with the invention.

FIG. 3 shows another memory system 80 similar to the memory system 10, but in which the invention is employed with a first-level cache 82 and a second-level cache 84. As in the memory system 10, CPU 85 is connected to tag field 86 of the first-level cache 82 by virtual address lines 88 and to data field 90 of the first-level cache by data lines 92. The CPU 85 is also connected to a TLB 94, which unlike the TLB 26 of FIG. 1, is located off integrated circuit chip 96, by virtual address lines 98. The CPU 85 is also connected to tag field 100 of the second-level cache 84 by virtual address lines 102. Data field 90 of the first-level cache 82 is connected to data field 104 of the second-level cache 84 by data lines 106. The TLB 94 is connected to status bits 108 and 110 of the first- and second-level caches 82 and 84 by status lines 112 and 114 and to third-level cache 116 by cache address lines 118, which comprise the virtual address lines 98 and physical address lines 120. The data field 104 of the second-level cache 84 is connected to the third-level cache 116 by data lines 120. The operation of the memory system 80 is the same as that of the memory system 10, except that there are two virtually addressed cache levels 82 and 84 in which selective flushing is employed. Other than as shown and described, the construction and operation of the FIG. 3 embodiment of the invention is the same as that of the FIG. 1 embodiment.

Figure 4:
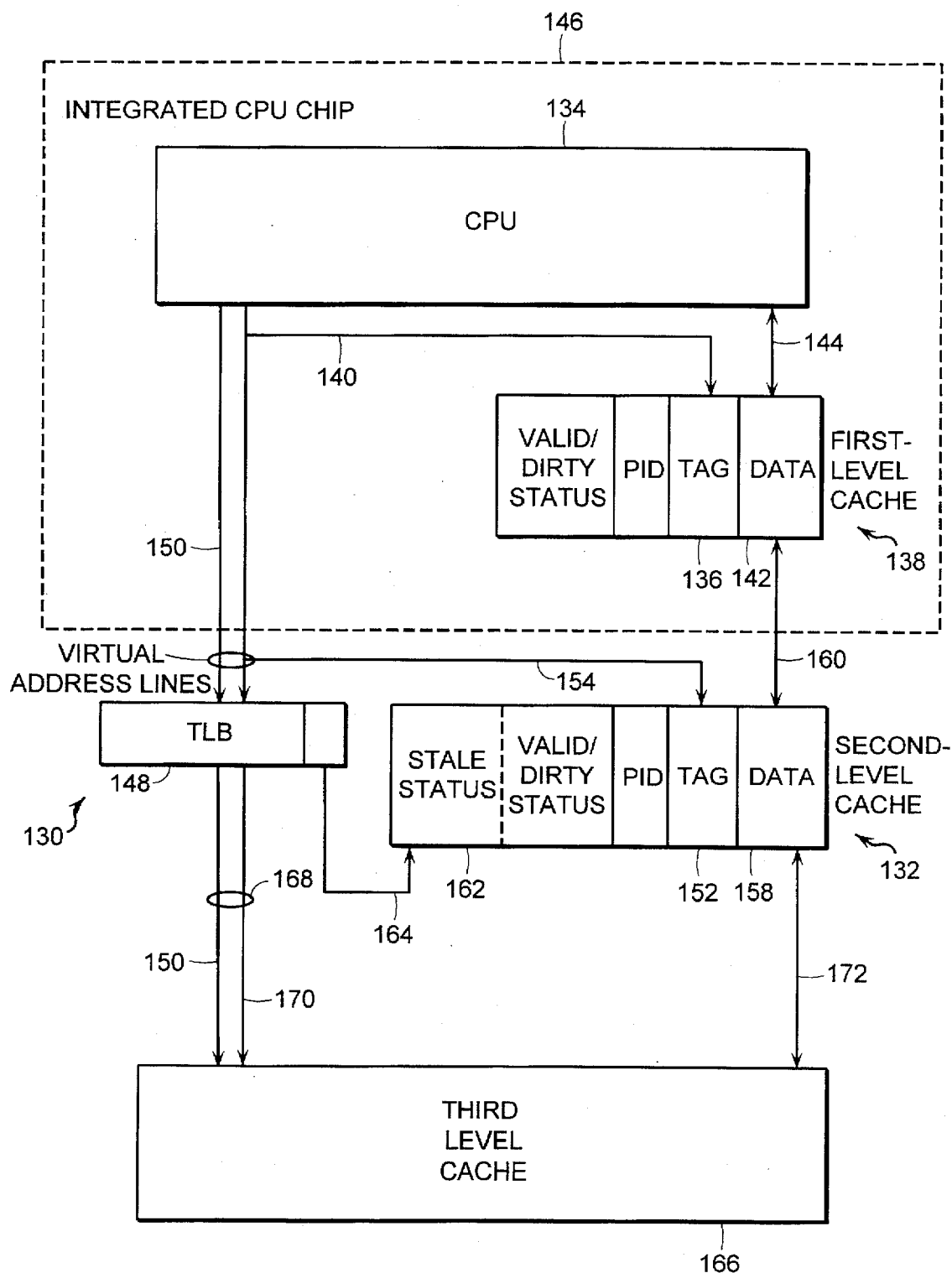
FIG. 4 is a block diagram of a third embodiment of a memory system in accordance with the invention.

FIG. 4 shows another memory system 130 similar to the memory systems 10 and 80, but in which the invention is employed with only a second-level cache 132. CPU 134 is connected to tag field 136 of first-level cache 138 by virtual address lines 140 and to data field 142 of the first-level cache by data lines 144. The CPU 134 is also connected to an off chip TLB 148 by virtual address lines 150. The CPU 134 is also connected to tag field 152 of the second-level cache 132 by virtual address lines 154. Data field 142 of the first-level cache 138 is connected to data field 158 of the second-level cache 132 by data lines 160. The TLB 148 is connected to status bit 162 of the second-level cache 132 by status lines 164 and to third-level cache 166 by cache address lines 168, which comprise the virtual address lines 150 and physical address lines 170. The data field 158 of the second-level cache 132 is connected to third-level cache 166 by data lines 172. The operation of the memory system 130 is the same as that of the memory systems 10 and 80, except that selective flushing is employed with only the second-level cache 132 of the two virtually addressed cache levels 138 and 132. Other than as shown and described, the construction and operation of the FIG. 4 embodiment of the invention is the same as that of the FIGS. 1 and 3 embodiments.

It should be apparent to those skilled in the art that various changes in form and details of the invention as shown and described may be made. For example, the invention has been described as implemented in a first-level cache and a second-level cache. There is no intrinsic reason to limit application of the invention to these levels, and it could be implemented in a third-level or a higher-level cache as well. It is intended that such changes be included within the spirit and scope of the claims appended hereto.

What is claimed is:

1. A cache memory system comprising:

a processor;

a cache, said cache comprising a plurality of entries, each entry of said cache comprising a tag field connected to said processor by at least one virtual address line and a data field, each entry of said cache further comprising a status field containing at least one bit for indicating possible membership of the corresponding entry in a class of entries requiring selective flushing from said cache, said class of entries comprising entries which are potential aliases;

said processor including means, coupled to the status field of each of the cache entries, for setting the at least one bit of the status field of a cache entry to indicate membership of that entry in said cache in the class of entries requiring selective flushing from said cache, said means for setting further comprising:

a translation look-aside buffer, said translation look-aside buffer comprising a plurality of entries corresponding to said plurality of entries of said cache, each entry of said translation lookaside buffer comprising a status field containing an appropriate value of the at least one bit of the status field of a corresponding cache entry; and fill means for loading the at least one bit of the status field of a cache entry with said status value from a corresponding location in said translation lookaside buffer as said cache entry is written to said cache; and said cache memory system further comprising means, connected to said cache, for selectively flushing an entry in said cache having the at least one bit of its status field set to indicate membership of that entry in the class of entries that are potential aliases.

2. The cache memory system of claim 1 in which said means for selectively flushing comprises an operation code for controlling operation of said processor.

3. The cache memory system of claim 1 in which each entry of said cache comprises a process-identifier field.

4. The cache memory system of claim 1 in which said cache is a second-level cache, said cache memory system further including a first-level cache having a plurality of entries, each entry having a first-level cache data field, said first-level cache being connected to said processor, said data field of each entry of said second-level cache being connected to one of said data fields of said first-level cache.

5. The cache memory system of claim 1 in which said means for selectively flushing comprises an OR gate connected to receive a special bit signal, indicating that an entry may be in the class of entries requiring selective flushing, from a virtual address supplied by said processor and to receive a signal indicative of the at least one bit of said status field of an entry in said cache as inputs, said OR gate having an output connected to a first input of an AND gate, a comparator connected to receive tag inputs from the virtual address and from the tag field of the entry in said cache, an output of said comparator being connected as a second input of said AND gate, said AND gate having an output for indicating that the entry in said cache should be flushed.

6. The cache memory system of claim 5 additionally comprising an inverter connected between the special bit in the virtual address and said OR gate.

7. The cache memory system of claim 1 in which said cache is a first-level cache and said data field is connected to said processor.

8. The cache memory system of claim 7, further comprising:

a second-level cache having a second-level cache entry including a second-level tag field connected to said processor by at least one second-level virtual address line and a second-level cache data field, said second-level cache entry further including a second-level status field containing at least one bit for indicating possible membership of the second-level cache entry in a class of entries requiring selective flushing from said second-level cache, said class of entries requiring selective flushing from said second level cache including entries which are potential aliases, said processor further comprising means for setting the at least one bit of said second-level status field, said means for selectively flushing further being connected to said second-level cache.

9. A method for operating a cache memory system having a processor and a cache, said cache having a plurality of entries, each of said entries having a tag field connected to the processor by at least one virtual address line, each of said entries further comprising a data field, said method comprising the steps of:

storing a status value in a status field in each of the entries of the cache, each status field comprising at least one bit for indicating the membership of the corresponding entry in a class of entries requiring selective flushing from the cache, said class comprising entries which are potential aliases;

setting the at least one bit of the status field of a cache entry to indicate membership of that entry in said cache in the class of entries requiring selective flushing from said cache, said setting step further comprising the steps of:

providing a translation look-aside buffer, said translation look-aside buffer comprising a plurality of entries corresponding to said plurality of entries of said cache, each entry of said translation lookaside buffer comprising a status field containing an appropriate value of the at least one bit of the status field of a cache entry; and loading the at least one bit of the status field of a cache entry with said status value from a corresponding location in said translation lookaside buffer as said cache entry is written to said cache; and said method of operating further comprising the step of, responsive to said status field of each one of said cache entries, selectively flushing the corresponding entry from said cache.

10. The method for operating a cache memory system of claim 9 wherein the step of selectively flushing further comprises the steps of:

locating, in response to an operation code, the entries of said cache having said at least one bit of said status field set; and invalidating each of the located entries by accessing each of the located cache entries to modify a validity indicator for each of the entries.

11. The method for operating a cache memory system of claim 10 wherein the step of invalidating each of the located cache entries further comprises the steps of:

ORing a special bit field of the address provided by said processor, said special bit field indicative of whether a corresponding entry in the cache is in a class of entries requiring selective flushing, with the at least one bit of the status field provided from a located entry in the cache;

comparing a tag input from the address provided by the processor to said tag field of the corresponding entry in the cache; and ANDing outputs of the ORing and the comparing steps to selectively provide an output for indicating that said located entry in the cache should be flushed.

12. The method for operating a cache memory system of claim 11 further comprising the step of inverting the special bit field indicating that an entry may be in a class of entries requiring selective flushing before being ORed with the at least one bit of the status field of the corresponding entry.

* * * * *